Nov. 22, 1966  S. DOLINSKY  3,286,333
HAND TOOL FOR USE IN CONNECTION WITH THREAD GUIDES
Original Filed Jan. 31, 1961  2 Sheets-Sheet 1
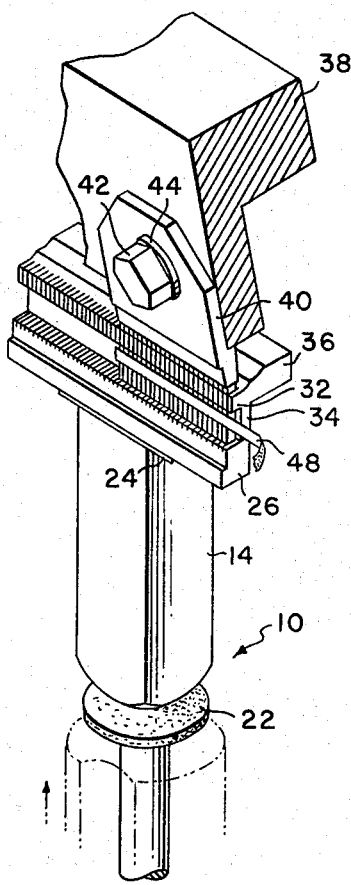
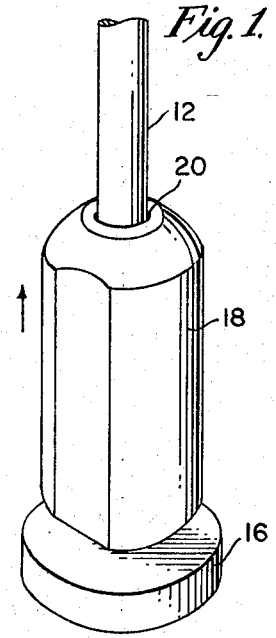
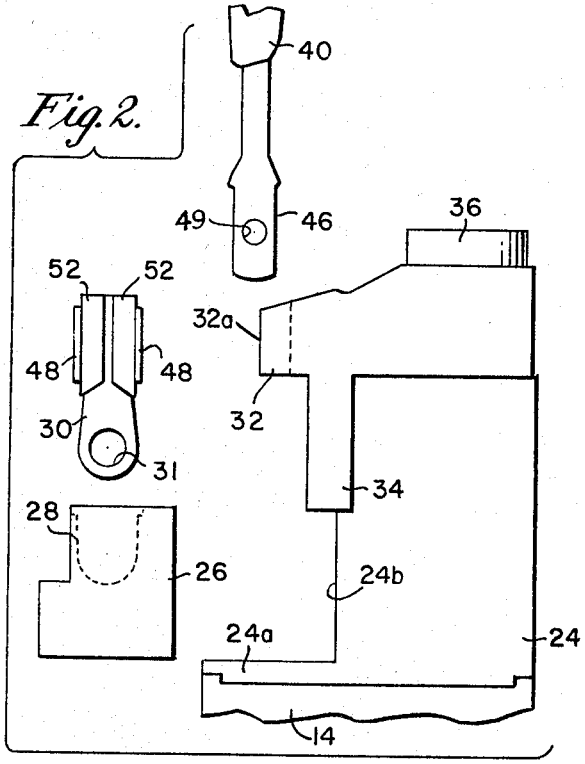
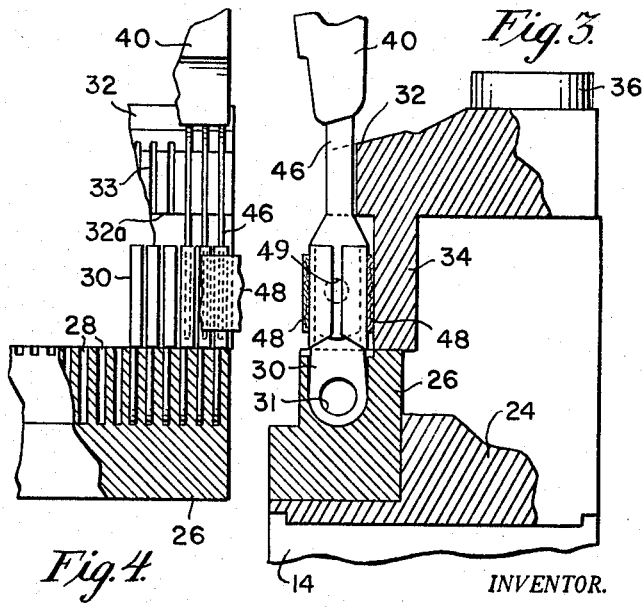
INVENTOR.
STANLEY DOLINSKY
BY
Caesar and Rivise
ATTORNEYS

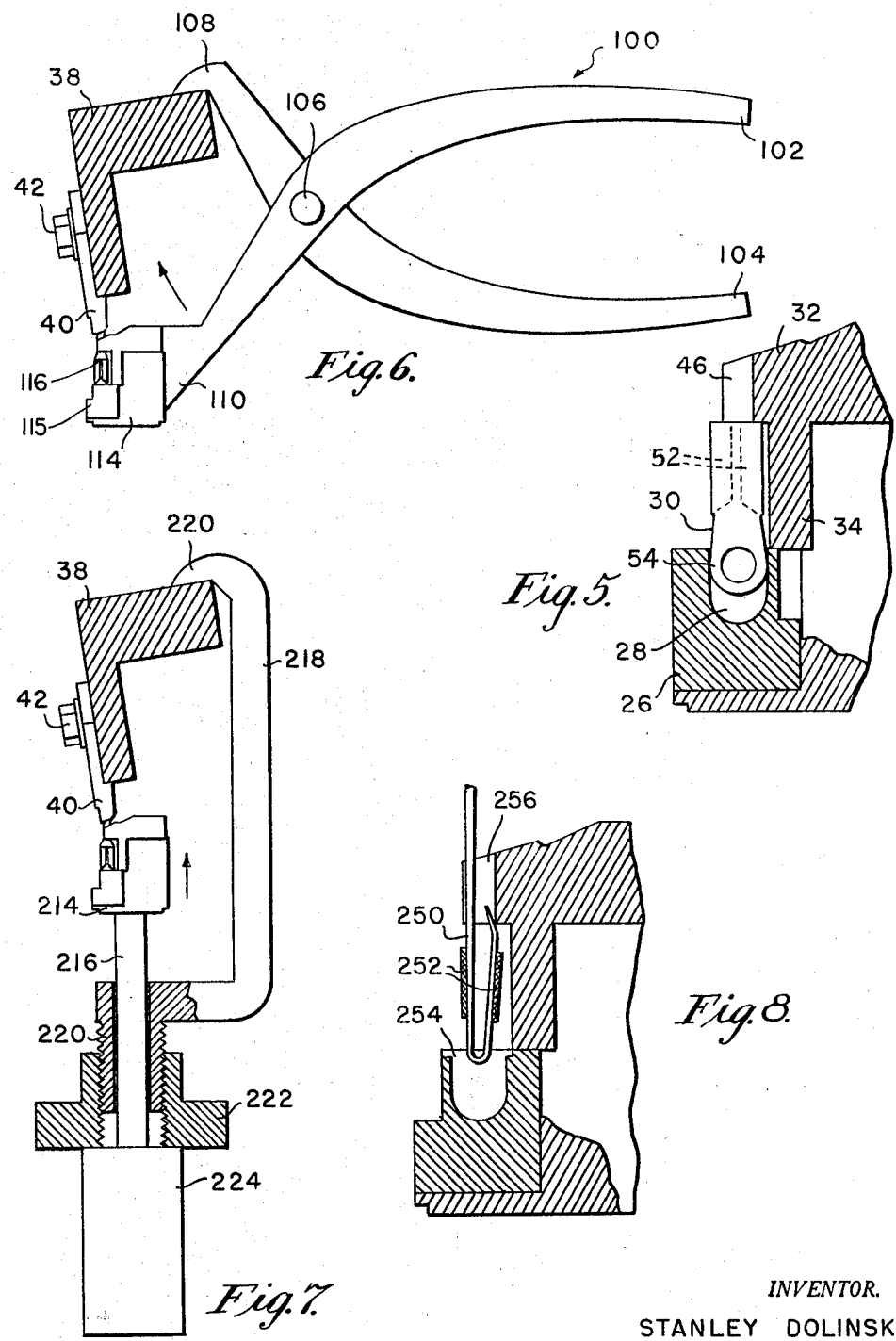

United States Patent Office 3,286,333
Patented Nov. 22, 1966

3,286,333
HAND TOOL FOR USE IN CONNECTION
WITH THREAD GUIDES
Stanley Dolinsky, 609 Madison Ave., Reading, Pa.
Continuation of application Ser. No. 86,073, Jan. 31,
1961. This application Mar. 31, 1964, Ser. No. 356,696
6 Claims. (Cl. 29—254)

This application is a continuation of application Serial No. 86,073, filed January 31, 1961, now abandoned.

This invention relates to a hand tool for use in connection with thread guides and, more particularly, to a hand tool which will greatly facilitate the application, removal and replacement or reversal of removable eye tips mounted on the shank of guides of a knitting machine.

The introduction of replaceable eye tips in accordance with the present inventor's United States Patent No. 2,962,883 represents a great advance in the art. Previously, the eye tip was formed integrally with the shank to provide the thread guides and hence when an eye tip was worn out, it was necessary not only to replace the entire guide, but also many other guides which extended from a common base. This practice was time consuming as well as wasteful. The advent of permanent shanks with replaceable eye tips as disclosed and claimed in Patent No. 2,962,883 has solved the foregoing problems. However, it has been found that the eye tips mounted on the same guide bar generally wear at about an equal rate and usually need replacement at about the same time. Because of the minuteness of the eye tips, replacement by hand is difficult and time consuming.

It is therefore an object of the present invention to provide a hand tool which may be used to apply, remove or reverse removable eye tips in gang.

Another object of the present invention is to provide such a hand tool which substantially minimizes time and effort in connection with the application, replacement or reversal of removable eye tips.

A further object of the present invention is to provide a tool which is simple and economical in construction and which is easily used.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a hand tool which comprises a body having a base for supporting an assembly of spaced apart tips arranged in a row beneath complementary spaced apart shanks of knitting elements arranged in a row on a warp knitting machine, the body having a comb above its base provided with teeth for insertion between the shanks to orient the tip assembly with respect to the shanks, and means connected to the body for applying a force thereto for effecting attachment of the row of tips to the row of shanks. When the teeth are moved downwardly along the shanks while inserted therebetween, the teeth serve to remove a row of tips from a row of shanks and to place the removed tips in tip assembly on the base. The tip assembly may then be reversed on the base, whereby the row of tips may be reapplied to the row of shanks in reversed position.

In the drawings:

FIG. 1 is a perspective view of a portion of a guide bar of a warp knitting machine and a first embodiment of a hand tool in accordance with the present invention showing a knocker member which is moved to apply the tip attaching force;

FIG. 2 is an enlarged, exploded, fragmentary side elevational view of the eye tip and shank receiving end of the tool of FIG. 1 including a shank and an eye tip of the guide bar;

FIG. 3 is a sectional view of the parts of FIG. 2 in assembled condition and in use;

FIG. 4 is a fragmentary front elevational view partly in section of the device of FIG. 1;

FIG. 5 is a view similar to FIG. 3 showing eye tips which have just been reversed and reapplied to complementary shanks;

FIG. 6 is a side elevational view partly in section of a hand tool, constituting a second embodiment of the present invention and being shown in use;

FIG. 7 is a side elevational view partly in section of a hand tool, constituting a third embodiment of the present invention and being shown in use; and FIG. 8 is a sectional view of a modification showing the insertion of a gang of bearded needles into the needle bar of a knitting machine.

Referring now in greater detail to the various figures of the drawings wherein similar reference characters refer to similar parts, a hand tool 10 for use in connection with thread guides, constituting a first embodiment of the present invention is generally shown in FIG. 1. The tool 10 comprises a handle 16, a tool support member 14, a neck portion or rod 12 integral with the handle 16 and the member 14, a knocker 18 having a central bore 20 and being slidably mounted upon the neck portion 12 so that it extends through the bore 20. In this manner the knocker 18 may be rapidly forced against tool support 14 for a purpose which will be discussed hereinafter. A shock absorbing pad 22 of felt or similar material is positioned about the neck portion 12 adjacent the tool support member 14 to cushion the blows inflicted by the knocker 18. The handle 16 serves as a stop for the knocker 18.

Suitably connected as shown in FIGS. 1 and 2, to the tool support member 14 is a generally L-shaped bracket member or body 24 provided with a base 24a and a wall 24b within which is nested an eye tip holding head 26 which is basically an elongated bar having formed therein a plurality of slits 28 adapted to releasably hold eye tips 30.

Spaced from the eye tip holding head 26 is a shank receiving head 32 which is basically an elongated bar or comb having teeth 32a formed therein by a plurality of slits 33 in alignment with slits 28 of the eye tip holding head. The head 26 is held on the base 24a by a bridging section 34 depending from the head 32 as shown in FIG. 3. Extending backwardly from the head 32 is a ledge section 36 upon which rests a guide bar 38 of the knitting machine.

As best indicated in FIG. 1, there is affixed to the guide bar 38 of the knitting machine in side-by-side relation, a plurality of guide assembling bases or blocks 40 each of which is affixed to the guide bar 38 by means of bolt 42 and associated with a washer 44. Extending from each guide assembly base 40 are a plurality of shanks 46 which are permanently affixed to its base 40. As disclosed and claimed in United States Patent No. 2,962,883, eye tips 30 may be removably secured to the shanks 46 in such a manner as to effect substantial labor savings. As previously discussed, the eye tips 30 (having eyes 31) are quite small and thus individual fastening thereof to a shank 46 would be a tedious process. This problem is overcome and solved by use of the present tool.

The eye tips are supplied in parallel spaced groups or assemblies so held by removable tape 48 adhered along two edges thereof. The eye tips are so spaced that they may be directly inserted in slits 28 without further manipulation as shown in FIG. 4. The shanks 46 are then positioned in slits 33 to align them between the main body of the eye tips 30 and wing sections 52 of the eye tips 30 which are spaced from the main body. The knocker 18 is then advanced to strike a blow against the pad 22 and the support member 14 to force the eye tips 30 into contact with the shanks 46 as shown in FIG. 3. The uniting of the eye tips and the shank is now complete and the assembly may be removed from tool 10. The teeth 32a of the head 32 can be withdrawn from the shanks and the tips are freed from the slits 28 of the head 26 by moving the tool horizontally towards the right as viewed in FIG. 3, without disturbing the tips. The tapes 48 are removed to complete the affixing of the eye tips. As indicated in FIGS. 2 and 3 the shanks 46 may each include an opening 49 which could interfit with a boss (not shown) on a complementary eye tip or vice versa as taught in United States Patent No. 2,962,883.

It should be noted that the eye tip holding head 26 is not necessarily an integral part of the tool. If eliminated, the function of head 26 may be carried out by furnishing the eyelets as a cartridge wherein the eyelets are embedded in a solid plastic or wax elongated bar. In this variation, when the eye tips have been affixed to the shanks and tool 10 is removed, the plastic or wax is merely broken away to complete the affixing procedure.

Because the eye tips 30 are readily removed, it has been found that after wearing has occurred adjacent one surface of the eye tip 30 (wherein thread bears against the end surface 54 of the eye tip 30), the eye tip 30 may be reversed so that the thread will bear against the opposing surface thereof thereby automatically doubling the life of the eye tip. In order to do this as shown in FIG. 5, the eye tip assembly head 26 is inserted in the tool 10 in such a manner that the eye tips 30 lie in the slits 28 and the shanks 46 lie in the slits 33. The head 32 is then moved downwardly so that the teeth thereof strip the eye tips from the shanks 46 and cause the tips to remain in the head 32. The guide assembling head 26 is then turned about (FIGS. 2 and 5) and the shanks 46 are reintroduced within the confines of the body member 30 and the wing surfaces 52 of the eye tips. The knocker 18 is employed as previously stated, if necessary, and the tool is withdrawn to complete the reversal process. In the reversal process, the tape 48 is not used as is readily apparent in FIG. 5 wherein the reversal process has been completed and the assembly is being withdrawn from the tool.

The second embodiment of the present invention is generally shown in FIG. 6 wherein the tool is of a plier type but is otherwise generally similar to the device of FIG. 1. In the tool 100 of FIG. 6, lever handles 102 and 104 are pivotally secured to each other by a pin 106 with jaws 108 and 110 extending therefrom. Secured to the lower jaw 110 is a support member 114 including an eye tip holding head 115 and a shank receiving head 116. After the eye tips 30 have been inserted in the eye tip holding head and the shanks 46 are introduced in the shank receiving head as aforesaid, the handles 102 and 104 are urged toward each other to apply a force and complete the securement of the eye tips to the shanks.

A third embodiment of the present invention is generally shown in FIG. 7 wherein a tool support member 214 of the screw thread type is mounted on a shaft 216. A claw 218 is revolvably telescoped about a portion of the shaft 216. The claw 218 includes a hooked end 220 which bears against the guide bar 38 of the knitting machine. The claw 218 also includes an externally threaded lower section 220 with threads adapted to mate with a threaded tightening member 222 which is integral with handle 224 and shaft 216. Thus the tightening member 222 may be rotated with respect to threaded end 220 in such a manner that the threaded end 220 with the claw 218 thereon is advanced downwardly as shown in FIG. 7. Such advancement causes a force to be exerted against the eye tip holding head which in turn forces the eye tips 30 into intimate contact with the shanks 46.

As shown in FIG. 8, the tool is adapted to affix gangs of needles 250 to the knitting machine. The needles 250 are spaced from each other and held in such position by tapes 252. In a manner similar to that shown in FIGS. 1 to 4, the needles 250 are releasably held in complementary slits 254 and 256 of the tool and then applied to receptacles in the needle bar of the knitting machine.

Obviously many modifications and variations of the present invention are possible in the light of the above teachings. It is, therefore, to be understood that within the scope of the appended claims, the invention may be practiced otherwise than as specifically described.

I claim:

1. A hand tool for attaching tips to and removing the tips from complementary spaced apart shanks of knitting elements arranged in a row on a warp knitting machine, comprising a body having a base and a wall for supporting and positioning an assembly of spaced apart tips arranged in a row beneath the shanks, said body having a comb above said base at one side thereof and extending inwardly at least partially across said base and being provided with teeth for insertion between the shanks above the point at which the tips are attached to the shanks, said teeth being positioned to vertically align the assembly of tips lengthwise with respect to the shanks, and means connected to said body for applying a force thereto for effecting attachment of the row of tips to the row of shanks, said teeth upon movement downwardly along the shanks while inserted therebetween serving to remove a row of tips from a row of shanks.

2. A hand tool according to claim 1, wherein said force applying means include a rod having its upper end connected to said body, and a knocker member slidably mounted on said rod for movement thereon to inflict blows against said body.

3. A hand tool according to claim 2, wherein said rod has a stop at its lower end for retaining said knocker member on said rod.

4. A hand tool according to claim 2, wherein a cushioning member is positioned between said body and said knocker member.

5. In a hand tool according to claim 1, wherein said force applying means include pliers having a first jaw for engaging the underside of said body and a second jaw for engaging a fixed element of the knitting machine above said body.

6. In a hand tool according to claim 1, wherein said force applying means include a screw clamp having a claw for engaging a fixed element of the knitting machine above said body and a movable member for applying pressure to said body at the underside thereof.

References Cited by the Examiner

UNITED STATES PATENTS

| | | | |
|---|---|---|---|
| 716,274 | 12/1902 | Peirce | 7—1 |
| 2,313,500 | 3/1943 | Anderson | 29—283 X |
| 2,377,304 | 6/1945 | Appel | 29—275 X |
| 2,623,275 | 12/1952 | Holmqvist | 29—267 X |
| 2,629,985 | 3/1953 | McDowell | 173—91 |
| 2,768,429 | 10/1956 | Willis | 29—418 |
| 2,962,883 | 12/1960 | Dolinsky | 66—86 |
| 2,968,809 | 1/1961 | Foreman et al. | 29—203 X |

WILLIAM FELDMAN, *Primary Examiner.*

MYRON C. KRUSE, *Examiner.*